US006204180B1

(12) United States Patent
Tom et al.

(10) Patent No.: US 6,204,180 B1
(45) Date of Patent: Mar. 20, 2001

(54) APPARATUS AND PROCESS FOR MANUFACTURING SEMICONDUCTOR DEVICES, PRODUCTS AND PRECURSOR STRUCTURES UTILIZING SORBENT-BASED FLUID STORAGE AND DISPENSING SYSTEM FOR REAGENT DELIVERY

(75) Inventors: Glenn M. Tom, New Milford; Peter S. Kirlin, Newtown; James V. McManus, Danbury, all of CT (US)

(73) Assignee: Advanced Technology Materials, Inc., Danbury ( * ) Notice: Subject to any disclaimer, the term of this patent is extended or adjusted under 35 U.S.C. 154(b) by 0 days.

(21) Appl. No.: 09/002,278

(22) Filed: Dec. 31, 1997

Related U.S. Application Data

(60) Provisional application No. 60/046,778, filed on May 16, 1997.

(51) Int. Cl.[7] ...................................................... B32B 17/00

(52) U.S. Cl. ........................... 438/689; 438/694; 438/745

(58) Field of Search ..................................... 438/689, 694, 438/245

(56) References Cited

U.S. PATENT DOCUMENTS

| | | | |
|---|---|---|---|
| 240,423 | 4/1881 | James . | |
| 1,608,155 | 11/1926 | Barnebey . | |
| 1,714,245 | 5/1929 | Schaefer ............................. | 96/146 X |

(List continued on next page.)

FOREIGN PATENT DOCUMENTS

| | | |
|---|---|---|
| 1095796 | 12/1960 | (DE) . |
| 2264512 | 3/1971 | (DE) . |
| 3139-781 | 10/1981 | (DE) . |

(List continued on next page.)

OTHER PUBLICATIONS

"Beaded Carbon UPS Solvent Recovery," Chemical Engineering, vol. 84, No. 18, pp. 39–40, Aug. 29, 1977 (copy in 96/126).

*Primary Examiner*—Timothy M. Speer
(74) *Attorney, Agent, or Firm*—Steven J. Hultquist; Oliver A. M. Zitzmann

(57) ABSTRACT

A process for fabricating an electronic device structure on or in a substrate. A storage and dispensing vessel is provided, containing a solid-phase physical sorbent medium having physically adsorbed thereon a fluid for fabrication of the electronic device structure, e.g., a source fluid for a material constituent of the electronic device structure, or a reagent such as an etchant or mask material which is utilized in the fabrication of the electronic device structure but does not compose or form a material constituent of the electronic device structure. In the process, the source fluid is desorbed from the physical sorbent medium and dispensing source fluid from the storage and dispensing vessel, and contacted with the substrate, under conditions effective to utilize the material constituent on or in the substrate. The contacting step of the process may include process steps such as ion implantation; epitaxial growth; plasma etching; reactive ion etching; metallization; physical vapor deposition; chemical vapor deposition; cleaning; doping; etc. The process of the invention may be employed to fabricate electronic device structures such as transistors; capacitors; resistors; memory cells; dielectric material; buried doped substrate regions; metallization layers; channel stop layers; source layers; gate layers; drain layers; oxide layers; field emitter elements; passivation layers; interconnects; polycides; electrodes; trench structures; ion implanted material layers; via plugs; precursor structures for the foregoing electronic device structures; and device assemblies comprising more than one of the foregoing electronic device structures. The electronic device structure fabricated by such process may in turn may be employed as a component of an electronic product such as a telecommunications device or electronic appliance.

39 Claims, 4 Drawing Sheets

U.S. PATENT DOCUMENTS

| | | | |
|---|---|---|---|
| 2,356,334 | 8/1944 | Maude et al. . | |
| 2,450,289 | 9/1948 | Marek | 96/146 X |
| 2,663,626 | 12/1953 | Spangler . | |
| 2,987,139 | 6/1961 | Bush . | |
| 2,997,371 | 8/1961 | Wadsworth et al. . | |
| 3,006,153 | 10/1961 | Cook . | |
| 3,080,307 | 3/1963 | Rinald | 96/127 X |
| 3,093,564 | 6/1963 | Weisman et al. | 96/127 X |
| 3,116,132 | 12/1963 | Haller et al. . | |
| 3,144,200 | 8/1964 | Taylor et al. . | |
| 3,176,444 | 4/1965 | Kiyonaga | 95/97 X |
| 3,264,803 | 8/1966 | Read | 96/146 X |
| 3,287,432 | 11/1966 | Sensel . | |
| 3,415,069 | 12/1968 | Hauser | 96/126 X |
| 3,469,375 | 9/1969 | Barrington et al. | 96/146 X |
| 3,675,392 | 7/1972 | Reighter . | |
| 3,713,273 | 1/1973 | Coffee . | |
| 3,719,026 | 3/1973 | Sand . | |
| 3,788,036 | 1/1974 | Lee et al. . | |
| 4,023,701 | 5/1977 | Dockery . | |
| 4,168,149 | 9/1979 | Armond et al. | 95/96 X |
| 4,263,018 | 4/1981 | McCombs et al. . | |
| 4,343,770 | 8/1982 | Simons . | |
| 4,414,005 | 11/1983 | DeBiévre et al. . | |
| 4,477,265 | 10/1984 | Kumar et al. | 95/96 X |
| 4,552,571 | 11/1985 | Dechene | 95/96 X |
| 4,578,256 | 3/1986 | Nishino et al. . | |
| 4,673,415 | 6/1987 | Stanford | 95/96 X |
| 4,723,967 | 2/1988 | Tom | 96/108 X |
| 4,738,693 | 4/1988 | Tom | 96/108 X |
| 4,738,694 | 4/1988 | Godino et al. | 96/126 X |
| 4,744,221 | 5/1988 | Knollmueller | 62/48 |
| 4,749,384 | 6/1988 | Nowobilski et al. . | |
| 4,761,395 | 8/1988 | Tom et al. | 502/401 |
| 4,869,733 | 9/1989 | Stanford | 95/96 X |
| 4,881,958 | 11/1989 | Eckardt et al. | 96/127 |
| 5,051,117 | 9/1991 | Prigge et al. | 95/95 |
| 5,089,244 | 2/1992 | Parent et al. . | |
| 5,114,440 | 5/1992 | Reiss | 95/96 |
| 5,133,787 | 7/1992 | Diot et al. . | |
| 5,151,395 | 9/1992 | Tom . | |
| 5,202,096 | 4/1993 | Jain | 96/126 X |
| 5,224,350 | 7/1993 | Mehra | 95/96 X |
| 5,238,469 | 8/1993 | Briesacher et al. | 96/126 X |
| 5,385,689 | 1/1995 | Tom et al. | 252/194 |
| 5,409,526 | 4/1995 | Zheng et al. . | |
| 5,417,742 | 5/1995 | Tamhankar et al. . | |
| 5,518,528 | 5/1996 | Tom et al. . | |

FOREIGN PATENT DOCUMENTS

| | | |
|---|---|---|
| 52-72373 | 12/1975 | (JP) . |
| 61-133116 | 6/1986 | (JP) . |
| 63-88017 | 10/1986 | (JP) . |
| 3-127606 | 10/1989 | (JP) . |
| 1181672A | 11/1983 | (SU) . |
| 1544475A1 | 12/1987 | (SU) . |
| 1583151A1 | 5/1988 | (SU) . |

APPARATUS AND PROCESS FOR MANUFACTURING SEMICONDUCTOR DEVICES, PRODUCTS AND PRECURSOR STRUCTURES UTILIZING SORBENT-BASED FLUID STORAGE AND DISPENSING SYSTEM FOR REAGENT DELIVERY

CROSS-REFERENCE TO RELATED APPLICATIONS

This priority of the following U.S. patent applications are hereby claimed: U.S. Provisional Patent Application No. 60/046,778 filed May 16, 1997 in the names of Glenn M. Tom, Peter S. Kirlin and James V. McManus for "Semiconductor Manufacturing System Utilizing Sorbent-Based Fluid Storage and Dispensing Apparatus and Method for Reagent Delivery;" U.S. patent application Ser. No. 08/650,634 filed May 20, 1996 in the names of Glenn M. Tom, W. Karl Olander and James V. McManus for "Fluid Storage and Delivery System Utilizing Carbon Sorbent Medium," U.S. patent application Ser. No. 08/650,633 filed May 20, 1996 in the names of Glenn M. Tom, Karl Olander and James V. McManus for "Fluid Storage and Delivery System Comprising High Work Capacity Physical Sorbent," U.S. patent application Ser. No. 07,742,856 filed Nov. 1, 1996 in the names of Glenn M. Tom and James V. McManus for "Process System With Integrated Gas Storage and Delivery Unit;" U.S. patent application Ser. No. 08/809,819 filed Apr. 11, 1997 in the name of Glenn M. Tom and James V. McManus for "Storage And Delivery System For Gaseous Compounds," and U.S. patent application Ser. No. 08/859,172 filed May 20, 1997 in the name of Glenn M. Tom for "High Capacity Gas Storage and Dispensing System."

BACKGROUND OF THE INVENTION

1. Field of the Invention

This invention relates generally to storage and dispensing apparatus and method for the selective dispensing of fluids from a vessel in which the fluid component(s) are sorptively retained by a solid sorbent medium, and from which the fluid component(s) are desorptively released from the sorbent medium in the dispensing operation. More particularly, the present invention relates to semiconductor manufacturing systems and processes utilizing such storage and dispensing apparatus and method for reagent delivery, to electronic device structures obtained by such semiconductor manufacturing processes, and to end use products including such electronic device structures.

2. Description of the Related Art

In a wide variety of industrial processes and applications, there is a need for a reliable source of process fluid(s) which is compact, portable, and available to supply the process fluid(s) on demand. Such industrial processes and applications include semiconductor manufacturing, ion implantation, manufacture of flat panel displays, medical treatment, water treatment, emergency breathing equipment, welding operations, space-based applications involving delivery of liquids and gases, etc. The aforementioned needs are particularly acute in the semiconductor manufacturing industry, due to progressively increasing electronic device integration densities and increasing wafer sizes, which demands a high level of process reliability and efficiency.

U.S. Pat. No. 4,744,221 issued May 17, 1988 to Karl O. Knollmueller discloses a method of storing and subsequently delivering arsine. In the disclosed method of this patent, arsine is contacted at a temperature of from about −30° C. to about +30° C. with a zeolite of pore size in the range of from about 5 to about 15 Angstroms to adsorb arsine on the zeolite. The arsine is subsequently dispensed by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders, as for example are conventionally employed in the semiconductor manufacturing industry to provide process gases. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapidly increasing interior gas pressure in the cylinder.

The gas storage and dispensing system of the Tom et al. patent thus reduces the pressure of stored sorbate gases by providing a vessel in which the gas is reversibly adsorbed onto a carrier sorbent, e.g., a zeolite, activated carbon and/or other adsorbent material.

Considering now the manufacture of semiconductors in greater detail, many processes used in semiconductor manufacture utilize hazardous materials, e.g., toxic, flammable or pyrophoric, in the vapor state. The safety of the manufacturing process in various instances could be significantly improved by replacing the currently used gas sources. In particular, hexamethyldisilazane (HMDS) and chlorotrimethylsilane (ClTMS) are used as a primers to increase the adhesion of photoresists to wafers. HMDS and ClTMS can be spun on the wafer but are typically applied either as a spray or a vapor. Photoresist developers and strippers are normally used as liquids but can also be used as vapors; these materials are acids or bases (organic or inorganic) and can have aromatic functionality. The safety of use of all these materials could be improved from their current mode of supply and usage in the semiconductor manufacturing facility.

In general, the manufacture of semiconductors requires very low contamination levels. Typical manufacturing facilities yield completed wafers with defect densities of a few tenths/$cm^2$. Maintaining the cleanliness of the tooling is essential to realizing a process flow at competitive costs. In-situ chamber cleans are now routine for most process tools. Many of the gases or high vapor pressure liquids used in these cleans are hazardous, exhibiting one or more of the following properties: toxicity, flammability, pyrophoricity and/or adverse impact on the ozone layer (by so-called global warming gases). The safety of the cleaning processes could be significantly improved by replacing the gas sources currently employed.

In addition to the aforementioned cleaning reagents, many other process gases used in the manufacture of semiconductors are hazardous and exhibit one or more of the following properties: toxicity, flammability or pyrophoricity. In particular, chemical vapor deposition processes (CVD) are carried out with gaseous or liquid feed stocks which in many instances are associated with significant health and safety issues. Such gases are essential to create the individual layers making up the semiconductor structure, but the safety of the manufacturing process could be significantly improved by replacing the fluid sources utilized in current conventional semiconductor manufacturing practice.

It would therefore be a significant advance in the art, and is accordingly an object of the present invention, to provide improved apparatus, systems and methodology to overcome the aforementioned problems in the manufacture of semiconductor products.

Other objects and advantages of the invention will be more fully apparent from the ensuing disclosure.

SUMMARY OF THE INVENTION

The present invention relates in a broad aspect to a process for the fabrication of semiconductor or other electronic device structures and for producing end use products comprising same. The process utilizes a storage and dispensing system which is arranged to supply fluid for processing operations in the fabrication of such device structures.

In one aspect, the present invention relates to a process for fabricating an electronic device structure on or in a substrate, comprising:

providing a storage and dispensing vessel containing a physical sorbent medium having physically adsorbed thereon a fluid for fabrication of the electronic device structure, such as a source fluid for a material constituent of the electronic device structure, or alternatively a reagent, e.g., an etchant, cleaning agent or mask material, which is utilized in the fabrication of the electronic device structure, but which does not compose or form a material constituent of the electronic device structure;

desorbing the fluid from the physical sorbent medium and dispensing the fluid from the storage and dispensing vessel; and contacting the substrate with the dispensed fluid from the storage and dispensing vessel, under conditions effective to utilize the fluid or a constituent thereof on or in the substrate.

In the process of the invention, the contacting step may include a process step such as for example:

(a) ion implantation;

(b) epitaxial growth;

(c) plasma etching;

(d) reactive ion etching;

(e) metallization;

(f) physical vapor deposition;

(g) chemical vapor deposition;

(h) photolithography;

(i) cleaning; or (j) doping.

In a preferred aspect, the present invention relates to a process for fabricating an electronic device structure on or in a substrate, comprising:

providing a storage and dispensing vessel containing a physical sorbent medium having physically adsorbed thereon a source fluid for a material constituent of the electronic device structure;

desorbing source fluid from the physical sorbent medium and dispensing source fluid from the storage and dispensing vessel; and contacting the substrate with dispensed source fluid from the storage and dispensing vessel, under conditions effective to deposit the material constituent on or in the substrate.

As used herein, the term "constituent" in reference to the fluid stored in and dispensed from the storage and dispensing vessel of the invention is intended to be broadly construed to encompass any components of the dispensed fluid, as well as the products thereof, e.g., reaction or decomposition products. The fluid may therefore comprise an organometallic reagent or other precursor yielding a metal or other material constituent for deposition on or in the substrate, e.g., by process steps such as chemical vapor deposition, ion implantation, etc.

The term "substrate" is also intended to be broadly construed to include all physical structures for the electronic device structure, including wafers, wafer bases, supports, base structures, etc. as well as physical structures for the electronic device structure, which are already partially formed, treated or processed, or which are precursor structures for the foregoing. Thus, the substrate may for example be a wafer per se. Alternatively, the substrate may for example be a partially fabricated device assembly which is being contacted with the dispensed process fluid(s) in further manufacturing operation(s).

In general, a wide variety of gases may be dispensed from the storage and dispensing vessel, for use in manufacturing operations, such as for example photolithography steps in the manufacture of VLSI and ULSI circuits, epitaxial deposition of film materials such as silicon from dispensed Si source gases, ion implantation and doping in the fabrication of CMOS, NMOS, BiCMOS and other structures, and manufacture of devices such as DRAMs, SRAMs, FeRAMs, etc.

The process of the invention may be employed to fabricate electronic device structures such as for example:

(a) transistors;

(b) capacitors;

(c) resistors;

(d) memory cells;

(e) dielectric material;

(f) buried doped substrate regions;

(g) metallization layers;

(h) channel stop layers;

(i) source layers;

(j) gate layers;

(k) drain layers;

(l) oxide layers;

(m) field emitter elements;

(n) passivation layers;

(o) interconnects;

(p) polycides;

(q) electrodes;

(r) trench structures;

(s) ion implanted material layers;

(t) via plugs;

(u) precursor structures for the foregoing (a)–(t) electronic device structures; and (v) device assemblies comprising more than one of the foregoing (a)–(t) electronic device structures.

As a further specific example, the electronic device structures fabricated by the process of the invention may comprise memory chip devices, such as:

(i) ROM chips;

(ii) RAM chips;

(iii) SRAM chips;

(iv) DRAM chips;

(v) PROM chips;

(vi) EPROM chips;

(vii) EEPROM chips; and (viii) flash memory chips.

In one preferred embodiment of the invention, the microelectronic device structure comprises a semiconductor logic chip (e.g., a microcontroller or microprocessor).

In another preferred embodiments, the contacting step comprises ion implantation. In yet another preferred embodiment, the contacting step comprises chemical vapor deposition, e.g., of polysilicon, using a silicon precursor such as silane or disilane, and in which the polysilicon may be doped with dopant species such as boron, phosphorus, arsine, etc.

In ion implantation, chemical vapor deposition and other semiconductor device fabrication processes of the invention, the fluid source for the semiconductor manufacturing step may include a metalorganic composition whose metal moiety is selected from the group consisting of aluminum, barium, strontium, calcium, niobium, tantalum, copper, platinum, palladium, iridium, rhodium, gold, tungsten, titanium, nickel, chromium, molybdenum, vanadium, and combinations of the foregoing.

As used herein, the term "electronic device structure" refers to a microelectronic device, a precursor structure for such a device, or a component structural part or subassembly for such a device. A precursor structure may for example comprise a substrate or wafer element for the device which has been treated to form a layer or element thereon or therein, such as a capacitor trench, a buried doped region, a passivated surface, etched wells for emitter tip formation, a barrier layer or interlayer on a wafer base, an integrated circuit ready for ceramic encapsulation, or any other structural article constituting less than the complete device ultimately desired as the end-use product.

It will be appreciated that an electronic device structure that is formed in one processing step of a multi-step process according to the present invention may, upon completion of that processing step, then become the substrate structure for the next succeeding processing step in the overall multi-step process.

The process of the present invention therefore utilizes a system for storage and dispensing of a sorbable fluid, comprising a storage and dispensing vessel constructed and arranged to hold a physical sorbent medium having a sorptive affinity for the sorbable fluid, and for selectively flowing sorbable fluid into and out of such vessel. A physical sorbent medium having a sorptive affinity for the fluid is disposed in the storage and dispensing vessel at an interior gas pressure. The sorbable fluid is physically adsorbed on the sorbent medium. A dispensing assembly is coupled in gas flow communication with the storage and dispensing vessel, and constructed and arranged for selective on-demand dispensing of desorbed fluid, by thermal and/or pressure differential-mediated desorption of the fluid from the sorbent material. The dispensing assembly may suitably be constructed and arranged:

(I) to provide, exteriorly of said storage and dispensing vessel, a pressure below said interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

The sorbent medium in the storage and dispensing system may include any suitable sorbent material. Preferred sorbent materials include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention.

Examples of such crystalline aluminosilicate compositions include 5A molecular sieve, and preferably a binderless molecular sieve.

Potentially useful carbon sorbent materials include so-called bead activated carbon of highly uniform spherical particle shape, e.g., BAC-MP, BAC-LP, and BAC-G-70R, available from Kreha Corporation of America, New York, N.Y.

Although carbon sorbents and molecular sieve materials such as crystalline aluminosilicates are preferred in many instances, the solid-phase physical sorbent medium may usefully comprise other materials such as silica, alumina, macroreticulate polymers or other polymers, kieselguhr, etc.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

In another aspect of the invention, a process is utilized for fabricating an electronic product including an electronic device structure, wherein the electronic device structure is fabricated with deposition of material on or in a substrate from a source fluid therefor, including the steps of:

providing said fluid in a vessel in which the fluid is sorptively retained by a physical sorbent medium;

desorbing said fluid from the physical sorbent medium as needed during the fabrication process and dispensing same from the vessel containing the physical sorbent medium; and contacting the dispensed fluid with the substrate to deposit said material on or in the substrate.

The product of the above-mentioned process may be a product such as a computer, personal digital assistant, telephone, flat panel display, monitor, sound system, electronic game, virtual reality device or smart consumer appliance. Smart consumer appliances may for example be appliances such as cooking appliances, refrigerators, freezers, dishwashers, clothes washing machines, clothes dryers, humidifiers, dehumidifiers, air conditioners, global positioning devices, lighting systems, and remote controllers for the foregoing.

In one aspect, the electronic product comprises a telecommunications device.

Other aspects and features of the invention will be more fully apparent from the ensuing disclosure.

DETAILED DESCRIPTION OF THE INVENTION, AND PREFERRED EMBODIMENTS THEREOF

Figure 1:
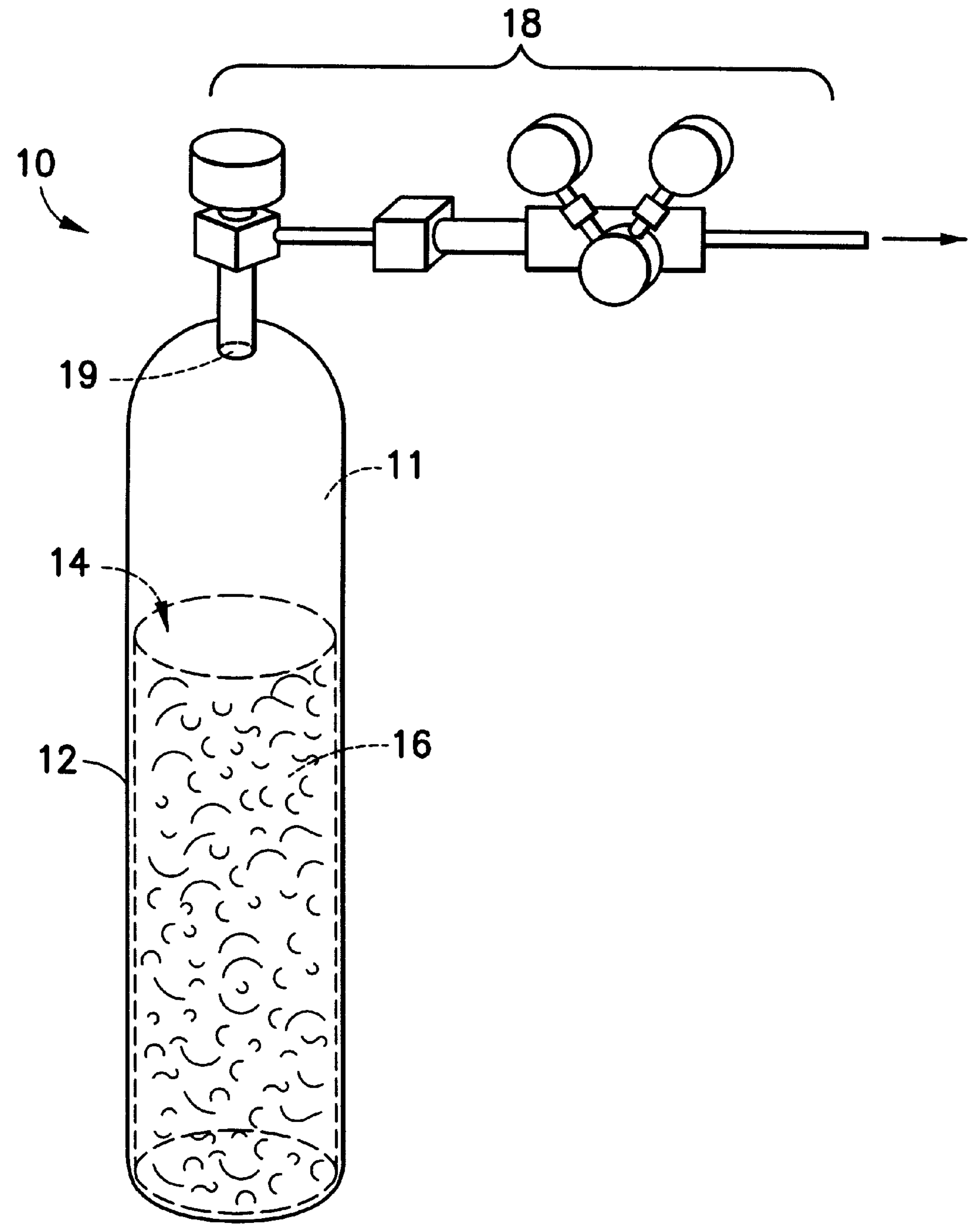
FIG. 1 is a schematic perspective representation of a storage and dispensing vessel and associated flow circuitry according to one embodiment of the invention, which may be usefully employed for the storage and dispensing of fluid.

The disclosures of the following U.S. patents and applications are hereby incorporated herein by reference in their entirties:

U.S. Pat. No. 5,518,528 issued May 21, 1996 in the names of Glenn M. Tom and James V. McManus; U.S. patent application Ser. No. 08/650,634 filed May 20, 1996 in the names of Glenn M. Tom and James V. McManus for "Fluid Storage And Delivery System Utilizing Carbon Sorbent Medium;" U.S. Provisional Patent Application No. 60/046,778 filed May 16, 1997 in the names of Glenn M. Tom, Peter S. Kirlin and James V. McManus for "Semiconductor Manufacturing System Utilizing Sorbent-Based Fluid Storage and Dispensing Apparatus and Method for Reagent Delivery;" U.S. patent application Ser. No. 08/650,633 filed May 20, 1996 in the names of Glenn M. Tom, Karl Olander and James V. McManus for "Fluid Storage and Delivery System Comprising High Work Capacity Physical Sorbent;" U.S. patent application Ser. No. 07,742,856 filed Nov. 1, 1996 in the names of Glenn M. Tom and James V. McManus for "Process System With Integrated Gas Storage and Delivery Unit;" U.S. patent application Ser. No. 08/809,819 filed Apr. 11, 1997 in the name of Glenn M. Tom and James V. McManus for "Storage And Delivery System For Gaseous Compounds;" and U.S. patent application Ser. No. 08/859,172 filed May 20, 1997 in the name of Glenn M. Tom for "High Capacity Gas Storage and Dispensing System."

The present invention utilizes fluid storage and dispensing means and method for the delivery of reagents for various unit operations of semiconductor manufacturing processes.

For example, the semiconductor manufacturing process may include photolithography steps. Typically, a wafer undergoes between 12 and 20 photolithography steps during the manufacture of very large scale integrated (VLSI) and ultra large scale integrated (ULSI) circuits. The vapor pressure of HMDS, TMS, photoresist strippers and developers can be reduced in accordance with the process of the present invention, by adsorbing the process liquids on solid adsorbents retained in a storage and dispensing system according to the invention. The resulting safer sources of the process fluids can be used in standard wafer tracks systems, to coat, develop, and strip photoresists from wafers during photolithography steps in the manufacturing process flow.

The process of the invention may also be directed to in-situ cleaning or other cleaning operations, in which the cleaning fluid is stored in and dispensed from a fluid storage and dispensing system of the invention. In-situ cleaning reduces process related defects and increases tool utilization by extending maintenance cycles. Examples of chamber cleans used in semiconductor tools are (1) $NF_3$ cleans of W CVD tools, Ti/TiN sputter tools, and Ti/TiN hybrid sputter/CVD tools, and (2) 1,1,1-trichloroethane (TCA), trans-1,2-dichloroethane (t-DCE) and HF cleans of furnaces and single wafer polysilicon/$SiO_2$ (both doped and undoped) deposition tools.

Cleaning gases can be adsorbed on sorbent media in accordance with the present invention, to form low vapor pressure sources of such cleaning fluids, which significantly reduce the hazard potential of such gases during their transportation, storage and use. The process of the present invention may for example be practiced with gaseous cleaning agents such as $Cl_2$ (used with a plasma for Al deposition) to remove solid and/or chemical contaminants from chamber walls of process equipment.

Concerning semiconductor manufacturing processes for integrated circuit fabrication, a number of layers in standard silicon integrated circuits are deposited by chemical vapor deposition (CVD) using hazardous source materials. Examples include (1) CVD of polysilicon or epitaxial silicon, which are deposited using $SiH_4$, $Si_2H_6$ or $SiH_xCl_{4-x}$ (x=0–4) as the Si source, and these films are often doped with $PH_3$ or $B_2H_6$ or $AsH_3$, (2) CVD of $SiO_2$ which utilizes $SiH_xCl_{4-x}$ (x=0–4) or tetraethylorthosilicate (TEOS) as the Si source, and a range of dopants including boron trichloride, trimethylborate, trimethylborite, triethylborate, triethylborite, phosphorous trichloride, trimethylphosphate, trimethylphosphite, triethylphoshate, triethylphosite, $PH_3$ or $B_2H_6$, (3) CVD of W which is carried out with $WF_6$ and sometimes $SiH_4$ or $Si_2H_6$ as a co-reactant, (4) CVD of TiN which utilizes $TiCl_4$ or tetrakisdimethylamidotitanium or tetrakisdiethylamidotitanium as the Ti source along with ammonia as the co-reactant, (5) CVD of $Si_3N_4$ which is grown with $SiH_xCl_{4-x}$ (x=0–4) as the Si source and ammonia or a nitrogen plasma discharge. Some of the above processes are carried out by thermal CVD and many may be conducted as plasma-assisted CVD processes; other forms of assistance such as UV light may also be used.

These examples illustrate the use of hazardous gases or liquids whose safety in transportation and use can be improved by adsorbing such fluid-phase process reagents on a physical adsorbent material that decreases the vapor pressure of the hazardous gas or liquid to form a safer source of the process fluid in accordance with the present invention.

In addition to the above specific examples of fluid usages in the semiconductor manufacturing industry, many other fluid reagent process steps are involved in semiconductor manufacturing. Accordingly, the foregoing discussion is not meant to be inclusive, and the sorbent-based fluid storage and delivery systems of the present invention are additionally applicable to a wide variety of CVD processes utilizing hazardous materials, as well as other fluid-consuming operations practiced in the semiconductor manufacturing industry.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Referring now to the drawings, FIG. 1 is a schematic representation of a storage and dispensing system 10 comprising storage and dispensing vessel 12. The storage and dispensing vessel may for example comprise a conventional gas cylinder container of elongate character, or other vessel of desired size and shape characteristics. In the interior volume of such vessel is disposed a bed 14 of a suitable sorbent medium 16.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The vessel 12 may also be provided with internal heating means (not shown) which serve to thermally assist desorption of the sorbate fluid. Preferably, however, the sorbate fluid is at least partially, and most preferably fully, dispensed from the storage and dispensing vessel containing the adsorbed fluid by pressure differential-mediated desorption. Such pressure differential may be established by flow communication between the storage and dispensing vessel, on the one hand, and the exterior dispensing environment or locus of use, on the other. The dispensing means for the vessel may include pumps, blowers, fans, eductors, ejectors, etc., or any other motive driver for flowing the fluid from the vessel to the locus of use of the dispensed fluid.

The sorbent medium 16 may comprise any suitable sorptively effective material, having sorptive affinity for the fluid to be stored and subsequently dispensed from the vessel 12, and from which the sorbate is suitably desorbable. Examples include crystalline aluminosilicate compositions, e.g., a micropore aluminosilicate composition with a pore size in the range of from about 4 to about 13 Å, mesopore crystalline aluminosilicate compositions with a pore size in the range of from about 20 to about 40 Å, carbon sorbent materials, such as a bead activated carbon sorbent of highly uniform spherical particle shape, e.g., BAC-MP, BAC-LP, and BAC-G-70R bead carbon materials (Kreha Corporation of America, New York, N.Y.), silica, alumina, macroreticulate polymers, kieselguhr, porous silicon, porous teflon, etc.

The sorbent material may be suitably processed or treated to ensure that it is devoid of trace components that may deleteriously affect the performance of the fluid storage and dispensing system. For example, the sorbent may be subjected to washing treatment, e.g., with hydrofluoric acid, to render it sufficiently free of trace components such as metals and oxidic transition metal species, or it may otherwise be heated or processed to ensure the desired purity and/or performance characteristics.

The sorbent may be provided in the form of particles, granules, extrudates, powders, cloth, web materials, honeycomb or other monolithic forms, composites, or other suitable conformations of useful sorbent materials, having sorptive affinity for the fluid to be stored and subsequently dispensed, and with satisfactory desorption characteristics for the dispensing operation.

As mentioned, although it generally is preferred to operate solely by pressure differential at ambient temperature conditions, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate fluid therein.

The present invention may beneficially employ the fluid storage and dispensing means and method for the delivery of reagents in a wide variety of unit operations of semiconductor manufacturing process systems.

Figure 2:
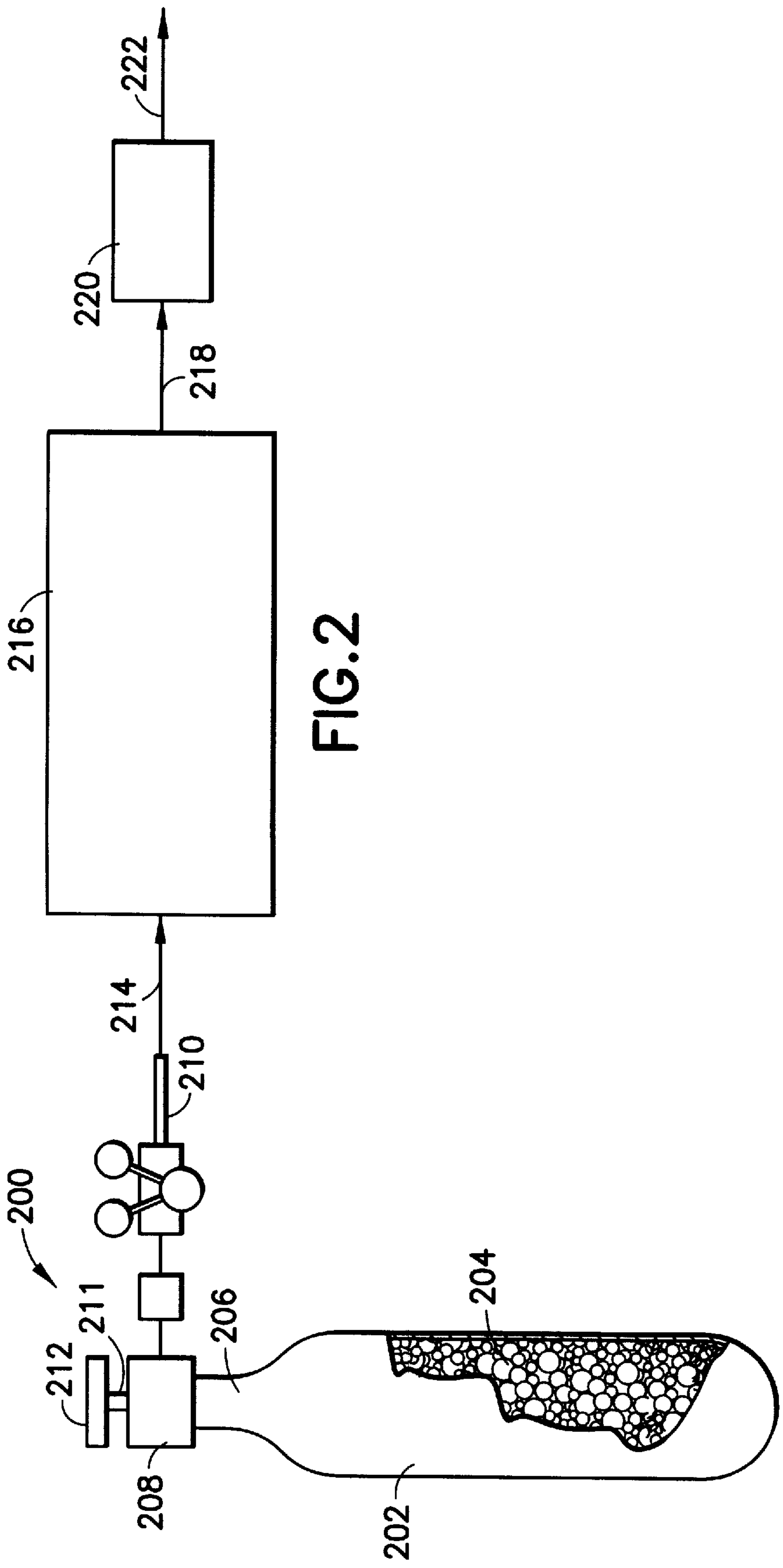
FIG. 2 is a schematic perspective view of a storage and dispensing vessel according to one embodiment of the present invention, shown in fluid dispensing relationship to a semiconductor manufacturing process system.

FIG. 2 is a schematic perspective view of a storage and dispensing system 200 according to one embodiment of the present invention, shown in fluid dispensing relationship to a semiconductor manufacturing process system 216.

The storage and dispensing system 200 comprises a storage and dispensing vessel 202 holding a bed 204 of sorbent material. The neck region 206 of the vessel 202 is joined to valve head 208, to which is joined a manually adjustable wheel 212 via valve stem 211, so that rotation of the wheel 212 opens the vessel to the flow of desorbate gas through gas discharge 210 to line 214 for flow to the semiconductor manufacturing operation 216. Following its use in the semiconductor manufacturing operation 216, the used gas may be passed in line 218 to the treatment complex 220, for treatment therein, and subsequent discharge from the system in line 222.

The semiconductor manufacturing process system 216 shown in FIG. 2 may suitably comprise wafer photolithography steps for the manufacture of VLSI and ULSI circuits. Sorbable fluids such as HMDS and TMS, and photoresist strippers and developers, can be adsorbed on solid adsorbents, such as carbon sorbents, polymeric sorbents including materials such as macroreticulate polymers of the type commercially available from Rohm & Haas Chemical Company (Philadelphia, Pa.) under the trademark "Amberlite," silica, alumina, aluminosilicates, etc., for use in accordance with the process of the invention.

The sorbate gas storage and dispensing systems of the present invention may therefore be employed in wafer tracks processes, for the purpose of coating, developing, and stripping photoresist from the wafers during photolithography steps in the manufacturing process flow.

The semiconductor manufacturing process system 216 may also involve fluid storage and dispensing of cleaning reagents, to carry out in-situ cleaning, and reduce process-related defects and increase tool utilization by extending maintenance cycles.

Illustrative cleaning reagents and appertaining semiconductor tools have been described hereinabove. In use, cleaning reagents may be sorptively retained in the storage and dispensing vessel (containing sorbent material having sorptive affinity for the fluid reagent), for storage and selective on-demand dispensing of reagents such as NF3, hydrogen fluoride, 1,1,1-trichloroethane, and trans-1,2-dichloroethane, chlorine, hydrogen chloride, etc.

The process of the present invention may be usefully employed for chemical vapor deposition of thin film materials, using CVD precursors such as silanes, chlorosilanes, tetraethylorthosilicate, tungsten hexafluoride, disilane, titanium tetrachloride, tetrakisdimethylamidotitanium, tetrakisdiethylamidotitanium, ammonia or other nitrogenous material, etc., and dopant materials such as boron, phosphorus, arsenic and antimony source reagents. Examples of such dopant source reagents include borane, boron trichloride, boron trifluoride, trimethylborate, trimethylborite, triethylborate, triethylborite phosphorous trichloride, trimethylphosphate, trimethylphosphite, triethylphosphate, triethlyphosphite, phosphine, arsine, diborane, etc., including deuterated and tritiated analogs of the foregoing hydrogen-containing dopant source reagents.

In general, the process of the present invention may be usefully employed in any instance where a fluid used in the fabrication of semiconductor device structures, either as a source material for material incorporated on or in a substrate or precursor device structure, or alternatively a process reagent such as an etchant, mask, resist, wash or other cleaning fluid, etc., is retainable in a vessel containing a sorbent material having sorptive affinity for the fluid. The fluid may be gas, vapor, liquid or other multi-phase composition, but the invention preferably utilizes a vapor or gas fluid which is sorptively retained by the sorbent medium in the storage and dispensing vessel.

Process steps with which the gas storage and dispensing methodology of the invention may be usefully employed, include, but are not limited to, ion implantation, epitaxial growth, plasma etching, reactive ion etching, metallization, physical vapor deposition, doping and chemical vapor deposition.

A variety of electronic device structures may be formed in accordance with the invention utilizing a process fluid dispensed from a storage and dispensing system of the invention. Examples of such electronic device structures include, but are not limited to, transistors, capacitors, resistors, memory cells, dielectric materials, varied doped substrate regions, metallization layers, channel stop layers, source layers, gate layers, drain layers, oxide layers, field emitter elements, passivation layers, interconnects, polycides, electrodes, trench structures, ion implanted material layers, via plugs, and precursor structures for the foregoing electronic device structures, as well as device assemblies comprising more than one of the foregoing electronic device structures.

The electronic device structure may for example comprise a memory chip device, such as a ROM, RAM, SRAM, DRAM, PROM, EPROM, EEPROM, and flash memory chips. Alternatively, the electronic device structure may comprise a semiconductor logic chip, such as a microcontroller chip or a microprocessor chip.

End use electronic products of the process of the invention include telecommunications devices, products such as computers, personal digital assistants, telephones, flat panel displays, monitors, sound systems, electronic games, virtual reality devices, and smart consumer appliances and consumer appliances such as cooking appliances, refrigerators, freezers, dishwashers, clothes washing machines, clothes dryers, humidifiers, dehumidifiers, air conditioners, global positioning devices, lighting systems, and remote controllers for the foregoing.

In one preferred aspect, the fluid source in the storage and dispensing vessel is selectively supplied to the semiconductor manufacturing process system for ion implantation, in which the fluid source for the ion implantation may for example be constituted by a metal organic composition whose metal moiety is a metal such as for example aluminum, barium, strontium, calcium, niobium, tantalum, copper, platinum, palladium, iridium, rhodium, gold, tungsten, titanium, nickel, chromium, molybdenum, vanadium, or combinations of two or more of the foregoing.

Figure 3:
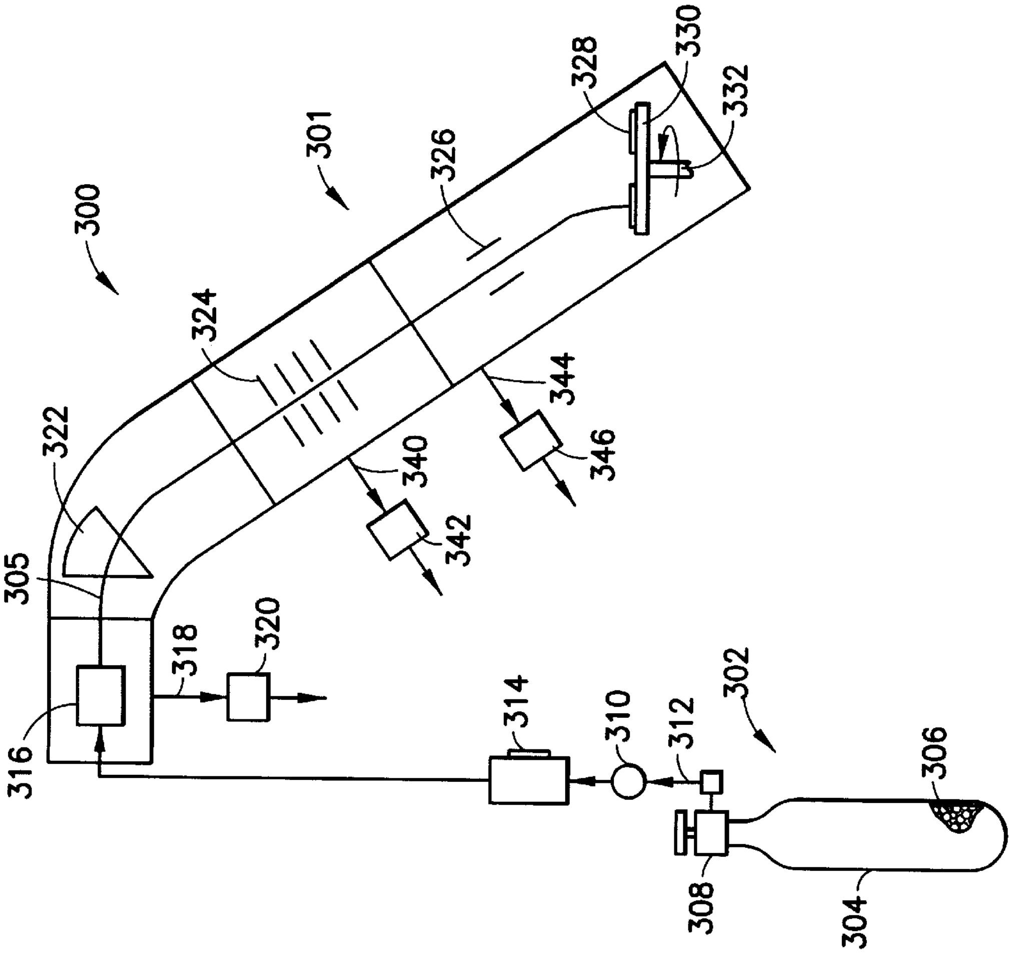
FIG. 3 is a schematic representation of an ion implant process system including a storage and dispensing vessel containing gas which is supplied for ion implantation doping of a substrate in the illustrated ion implant chamber.

FIG. 3 is a schematic representation of an ion implant process system 300 including a storage and dispensing vessel 302 containing a sorbent material 306 in its interior volume holding arsine gas which is supplied for ion implantation doping of a substrate 328 in the illustrated ion implant chamber 301.

The storage and dispensing vessel 302 comprises a vessel wall 306 enclosing an interior volume holding the sorbent material 306, which may be in a bead, particle or other finely divided form. A sorbate gas is retained in the interior volume of the vessel on the sorbent material.

The storage and dispensing vessel 302 includes a valve head 308 coupled in gas flow communication with a discharge line 312. A pressure sensor 310 is disposed in the line 312, together with a mass flow controller 314; other monitoring and sensing components may be coupled with the line, and interfaced with control means such as actuators, feedback and computer control systems, cycle timers, etc.

The ion implant chamber 301 contains an ion beam generator or ionizer 316 receiving the dispensed gas, e.g., arsine, from line 312 and generating an ion beam 305. The ion beam 305 passes through the mass analyzer unit 322 which selects the ions needed and rejects the non-selected ions.

The selected ions pass through the acceleration electrode array 324 and then the deflection electrodes 326. The resultingly focused ion beam is impinged on the substrate element 328 disposed on the rotatable holder 330 mounted in turn on spindle 332. The ion beam of $As^+$ ions is used to n-dope the substrate as desired to form an n-doped structure.

The respective sections of the ion implant chamber 301 are exhausted through lines 318, 340 and 344 by means of pumps 320, 342 and 346, respectively.

Figure 4:
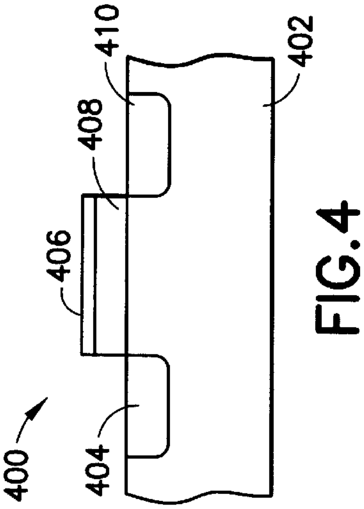
FIG. 4 is a schematic cross-sectional elevation view of an NMOS transistor structure which is formed in the process system shown in FIG. 3, comprising n-doped source and drain regions.

FIG. 4 is a schematic cross-sectional elevation view of an NMOS transistor structure 400 which may be formed in a process system of the type shown in FIG. 3, comprising n-doped source 404 and n-doped drain 410 regions. The substrate 402 may for example be a p-type substrate having a gate oxide layer 408 with a gate layer 406 thereon. The n-doped source and drain regions may be formed by implantation of $As^+$ ions impinged on the substrate at a suitable energy, e.g., 110 KeV, to yield regions 404 and 410 doped at an appropriate flux, as for example $10^{15}$ ions per square centimeter, for the desired end use transistor structure.

In the fabrication of the structure shown in FIG. 4 in accordance with the present invention, the $As^+$ ions may be formed by introduction of arsine or other arsenic precursor gas species from the storage and dispensing vessel in which the precursor gas is sorptively stored at a suitable pressure, e.g., in the range of 600–750 Torr so as to be at substantially atmospheric pressure.

Figure 5:
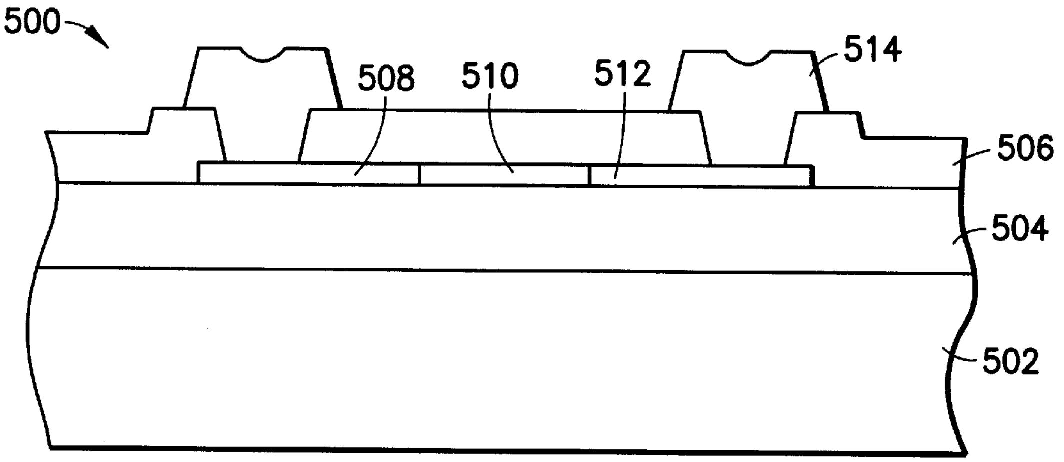
FIG. 5 is a cross-sectional elevation view of a portion of a static random access memory (SRAM) structure comprising structural features formed with the use of gas reagents dispensed from a storage and dispensing vessel of the type shown in FIG. 1.

FIG. 5 is a cross-sectional elevation view of a portion of a static random access memory (SRAM) structure 500 comprising structural features formed with the use of gas reagents dispensed from a storage and dispensing vessel of the type shown in FIG. 1.

The SRAM structure 500 comprises a substrate 502 which may for example comprise p-type silicon, on which is deposited oxide layer 504 which may comprise $SiO_2$ formed by epitaxial thin film deposition from a silicon source precursor such as those identified hereinabove, supplied from a fluid storage and dispensing vessel in accordance with the present invention.

Alternatively, the oxide layer 504 may be formed by oxidation of the substrate 502 to form layer 504 thereon, utilizing an oxidizing agent which is dispensed from a fluid storage and delivery vessel in accordance with the process of the present invention.

Overlying the oxide layer 504 is a polysilicon resistor element 510 flanked by layer regions 508 and 512, which may be suitably doped with an n-dopant such as $As^{+,}$ or antimony or phosphorous dopant species, to provide the n-doped flanking regions. The overlying dielectric layer 506 may be formed of silica, by chemical vapor deposition, as previously described in connection with the formation of layer 504. The silica layer 506 as shown has been etched away by a fluid-phase etchant which may be appropriately dispensed from a storage and dispensing vessel in accordance with the process of the present invention, to provide wells or trenches for metallization elements 514.

The fabrication process for the polysilicon resistor structure of the SRAM cell shown in FIG. 5 may therefore be carried out with dispensing of process fluids for the constituent process steps of ion implantation, chemical vapor deposition, etching and metallization. It will be appreciated that the process steps of the invention may be carried out in a fluid environment, at the locus of fabrication, which interacts, supports or otherwise facilitates the utilization of the dispensed fluid in the fabrication process of the electronic device structure.

Figure 6:
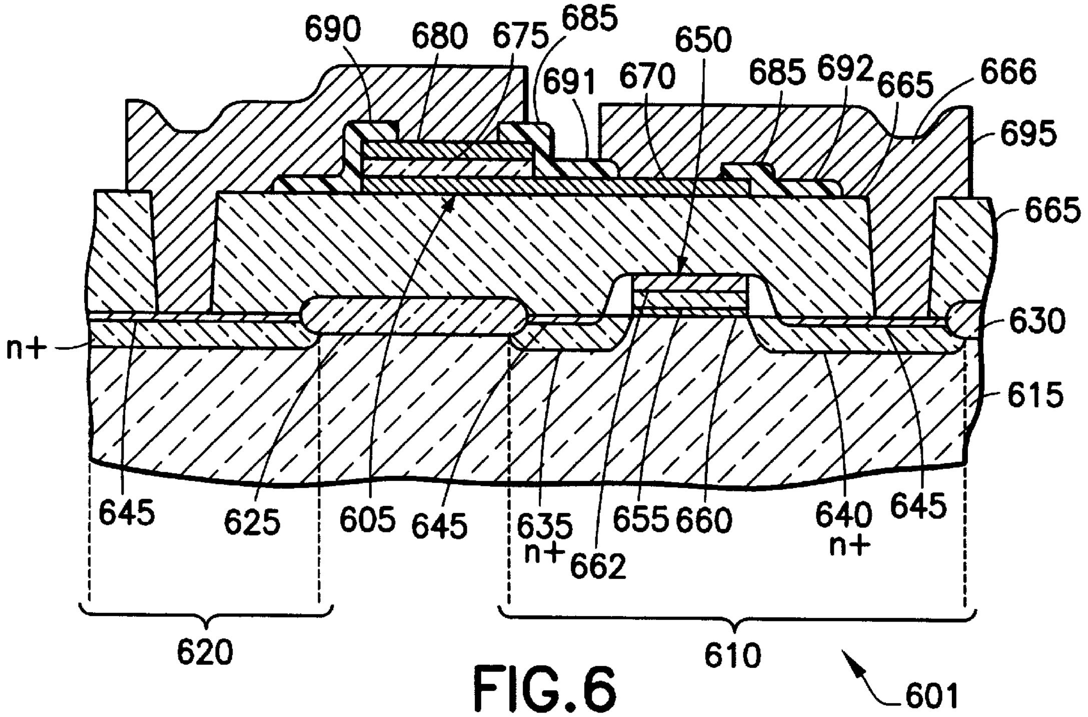
FIG. 6 is a schematic representation of a portion of an integrated circuit with an integrated capacitor, such as may be fabricated in accordance with the process of the present invention.

FIG. 6 is a schematic representation of a portion of an integrated circuit structure including an integrated capacitor, which may be fabricated in accordance with the process of the present invention.

The illustrated portion of integrated circuit 601 includes a first active device 610, such as a conventional metal-oxide-semiconductor field effect transistor (MOSFET), and a capacitor 605 employing a dielectric film layer, such as a layer of barium strontium titanate (BST) formed on a substrate 615, such as a silicon substrate. A drain region of a second transistor 610 is also illustrated.

The specific type of active devices employed in this structure may constitute NMOS, PMOS or CMOS structures, as may be desired for the end use application of the integrated circuit. Other potentially useful active devices in such structure include, for example, bipolar junction transistors and gallium arsenide MESFETs. The transistors 610 and 620 can be fabricated by processing methods utilizing reagents dispensed from sorbent storage and dispensing systems in accordance with the process of the invention.

In FIG. 6, the transistors 610 and 620 include field oxide regions 625 and 630 which are formed, for example, by $SiO_2$ and operate as insulators between the transistor 610 and adjacent devices such as transistor 620.

Source and drain regions 635 and 640 of the transistor 610 are formed by doping with n-type impurities, such as arsenic or phosphorous for NMOS structures. An optional layer of silicide 645 is deposited over the source and drain regions 635 and 640 to reduce the source and drain resistance, which enables greater current delivery by the transistor 610.

A gate 650 of the transistor 610 includes, for example, polysilicon 655 doped with an n-type impurity, such as by ion implantation or vapor doping, utilizing a fluid dispensed from a storage and dispensing vessel in according with the process of the invention. The gate polysilicon 655 is disposed on a $SiO_2$ spacer 650. An optional layer of silicide 662 is also deposited over the gate polysilicon 655 to reduce the electrical resistance of the gate 650. An insulating layer 665 of, for example, P-glass which is oxide doped with phosphorous is then deposited on the transistors 610 and 620, to provide protection to the transistors and facilitate electrical connection.

Contact windows 666 are then etched in the insulating layer 665 to expose the device gate 650 and source and drain regions, such as the regions 635 and 640. Although only the drain regions of the transistors 610 and 620 are exposed in the cross-section of the integrated circuit illustrated in FIG. 6, it will be readily appreciated that the gate and source are exposed to other areas of the integrated circuit 601, outside the illustrated cross-section.

At least one capacitor such as the capacitor 605 illustrated in FIG. 6 is formed on the integrated circuit, such as on the insulating layer surface. The capacitor 605 includes a first electrode 670 formed on the insulating layer surface, a dielectric thin film region 675 on the first electrode 670, and a second electrode 680 formed on the dielectric film region 675 opposite the first electrode 670. It is possible for the first electrode 670 to have a two-layer structure, e.g., a layer of platinum over a layer of titanium nitride. Platinum is a suitable electrode material, however, it reacts adversely with silicon. In consequence, a diffusion barrier is usefully employed as the second electrode layer which is in contact with the insulating layer surface to preclude such chemical reaction between platinum and the silicon of the substrate 615. Suitable thicknesses for each layer of the two-layer structure may be in the range of from about 0.01 to about 0.5 micrometer.

Alternatively, the integrated circuit of the general type shown in FIG. 6 may be formed with deposition of an electrically conductive interconnection layer on the surface of the insulating layer 665 in specific patterns to electrically connect devices via the etched regions and other circuit components in a desired manner.

As a further alternative construction of the device structure shown in FIG. 6, it is possible for the first electrode 670 to be a single layer structure of appropriate conductive material. Overall suitable thicknesses for the first electrode 670, whether a 1- or a 2-layer structure, may be in the range of from about 0.1 to about 0.5 micrometers. The first electrode 670 is suitably larger than the second electrode 680 to provide electrical connection to the first electrode 670.

After formation of the capacitor 605, an insulating material 685, such as for example $SiO_2$, is deposited on edge regions 690, 691 and 692 of the capacitor 605, to prevent short circuits between the first and second capacitor electrodes 670 and 680 when the interconnection layer is formed. An interconnection layer 695 then is formed on the insulation layer and correspondingly etched contact windows to electrically connect the devices 610 and 620 and the capacitors 605 in a desired manner. Suitable materials for the interconnection layer 695 include aluminum and/or copper, which may be deposited from corresponding metalorganic precursors dispensed from the sorbent storage and dispensing vessel in accordance with the process of the invention. In the integrated circuit 601, the drain 640 of the transistor 610 is electrically connected to the first electrode 670 of the capacitor 680 and the second electrode 680 of the capacitor is electrically connected to the source of the transistor 620.

It will be appreciated from the foregoing description that the invention may be carried out to deliver any of a wide variety of semiconductor manufacturing reagents in the semiconductor manufacturing plant, with the choice of the sorbent medium, and the mode of dispensing being readily determinable without undue experimentation by the skilled artisan, by simple adsorption and desorption tests to determine proper materials and process conditions.

Thus, while the invention has been shown and described with reference to specific features, aspects and embodiments herein, it will be appreciated that the invention is susceptible of a wide variety of other embodiments, features and implementations consistent with the disclosure herein. The invention as claimed is therefore to be broadly construed and interpreted, within the spirit and scope of the foregoing disclosure.

What is claimed is:

1. A process for fabricating an electronic device structure on or in a substrate, comprising:

providing a fluid source for fluid to be used in fabricating an electronic device structure on or in a substrate, said fluid source comprising a fluid storage and dispensing vessel containing a physical sorbent medium having physically adsorbed thereon a fluid for use in fabrication of the electronic device structure;

desorbing the fluid from the physical sorbent medium and dispensing source fluid from the storage and dispensing vessel; and contacting the substrate with the dispensed fluid from the storage and dispensing vessel, under conditions effective to utilize the fluid or a constituent thereof on or in the substrate in said fabrication of the electronic device structure.

2. A process according to claim 1, wherein the contacting step comprises a process step selected from the group consisting of:

(a) ion implantation;
(b) epitaxial growth;
(c) plasma etching;
(d) reactive ion etching;
(e) metallization;
(f) physical vapor deposition;
(g) chemical vapor deposition;
(h) photolithography;
(i) cleaning; and
(j) doping.

3. A process according to claim 1, wherein the electronic device structure is selected from the group consisting of:

(a) transistors;
(b) capacitors;
(c) resistors;
(d) memory cells;
(e) dielectric materials;
(f) buried doped substrate regions;
(g) metallization layers;
(h) channel stop layers;
(i) source layers;
(j) gate layers;
(k) drain layers;
(l) oxide layers;
(m) field emitter elements;
(n) passivation layers;
(o) interconnects;
(p) polycides;
(q) electrodes;
(r) trench structures;
(s) ion implanted material layers;
(t) via plugs;
(u) precursor structures for the foregoing (a)–(t) electronic device structures; and
(v) device assemblies comprising more than one of the foregoing (a)–(t) electronic device structures.

4. A process according to claim 1, wherein the electronic device structure comprises a memory chip device.

5. A process according to claim 4, wherein the memory chip device comprises a device selected from the group consisting of:

(i) ROM chips;
(ii) RAM chips;
(iii) SRAM chips;
(iv) DRAM chips;
(v) PROM chips;
(vi) EPROM chips;
(vii) EEPROM chips; and
(viii) flash memory chips.

6. A process according to claim 1, wherein the electronic device structure comprises a semiconductor logic chip.

7. A process according to claim 1, wherein the electronic device structure comprises a semiconductor logic chip selected from the group consisting of microcontrollers and microprocessors.

8. A process according to claim 1, wherein the electronic device structure comprises a microcontroller.

9. A process according to claim 1, wherein the electronic device structure comprises a microprocessor.

10. A process according to claim 1, wherein the contacting step comprises ion implantation.

11. A process according to claim 10, wherein the fluid for the ion implantation comprises a metalorganic composition whose metal moiety is selected from the group consisting of aluminum, barium, strontium, calcium, niobium, tantalum, copper, platinum, palladium, iridium, rhodium, gold, tungsten, titanium, nickel, chromium, molybdenum, vanadium, and combinations of the foregoing.

12. A process according to claim 1, wherein the contacting step comprises chemical vapor deposition.

13. A process according to claim 1, wherein the contacting step comprises chemical vapor deposition of polysilicon.

14. A process according to claim 1, wherein the contacting step comprises forming a doped polysilicon material on the substrate.

15. A process according to claim 1, wherein the physical sorbent medium comprises a sorbent material selected from the group consisting of carbonaceous materials, silica, alumina, aluminosilicates, kieselguhr and polymeric sorbent materials.

16. A process according to claim 1, wherein the fluid comprises a reagent utilized in the fabrication of the electronic device structure, but which does not compose or form a material constituent of the electronic device structure.

17. A process for fabricating an electronic device structure on or in a substrte, comprising:

providing a fluid source for fluid to be used in fabricating an electronic device structure on or in a substrate, said fluid source comprising a fluid storage and dispensing vessel containing a solid-phase physical sorbent medium having physically adsorbed thereon a source fluid for use in a material constituent of the electronic device structure;

desorbing source fluid from the physical sorbent medium and dispensing source fluid from the storage and dispensing vessel; and contacting the substrate with dispensed source fluid from the storage and dispensing vessel, under conditions effective to deposit the material constituent on or in the substrate, in said fabrication of the electronic device structure.

18. A process according to claim 17, wherein the contacting step comprises a process step selected from the group consisting of:

(a) ion implantation;
(b) epitaxial growth;
(c) plasma etching;
(d) reactive ion etching;
(e) metallization;
(f) physical vapor deposition;
(g) chemical vapor deposition; and
(h) doping.

19. A process according to claim 17, wherein the electronic device structure is selected from the group consisting of:

(a) transistors;
(b) capacitors;
(c) resistors;
(d) memory cells;
(e) dielectric material;
(f) buried doped substrate regions;
(g) metallization layers;
(h) channel stop layers;
(i) source layers;
(j) gate layers;
(k) drain layers;
(l) oxide layers;
(m) field emitter elements;
(n) passivation layers;
(o) interconnects;
(p) polycides;
(q) electrodes;
(r) trench structures;
(s) ion implanted material layers;
(t) via plugs;
(u) precursor structures for the foregoing (a)–(t) electronic device structures; and
(v) device assemblies comprising more than one of the foregoing (a)–(t) electronic device structures.

20. A process according to claim 17, wherein the electronic device structure comprises a memory chip device.

21. A process according to claim 20, wherein the memory chip device comprises a device selected from the group consisting of:

(i) ROM chips;
(ii) RAM chips;
(iii) SRAM chips;
(iv) DRAM chips;
(v) PROM chips;
(vi) EPROM chips;
(vii) EEPROM chips; and
(viii) flash memory chips.

22. A process according to claim 17, wherein the electronic device structure comprises a semiconductor logic chip.

23. A process according to claim 17, wherein the electronic device structure comprises a semiconductor logic chip selected from the group consisting of microcontrollers and microprocessors.

24. A process according to claim 17, wherein the electronic device structure comprises a microcontroller.

25. A process according to claim 17, wherein the microelectronic device structure comprises a microprocessor.

26. A process according to claim 17, wherein the contacting step comprises ion implantation.

27. A process according to claim 26, wherein the fluid source for the ion implantation comprises a metalorganic composition whose metal moiety is selected from the group consisting of aluminum, barium, strontium, calcium, niobium, tantalum, copper, platinum, palladium, iridium, rhodium, gold, tungsten, titanium, nickel, chromium, molybdenum, vanadium, and combinations of the foregoing.

28. A process according to claim 17, wherein the contacting step comprises chemical vapor deposition.

29. A process according to claim 17, wherein the contacting step comprises chemical vapor deposition of polysilicon.

30. A process according to claim 29, wherein the chemical vapor deposition of polysilicon is carried out with a precursor selected from the group consisting of silane and disilane.

31. A process according to claim 17, wherein the contacting step comprises forming a doped polysilicon material on the substrate.

32. A process according to claim 30, wherein the contacting step comprises doping the polysilicon material with a dopant selected from the group consisting of boron, phosphorus and arsenic.

33. A process according to claim 31, wherein the doping is conducted with a dopant precursor selected from the group consisting of diborane, phosphine and arsine.

34. A process according to claim 28, wherein the chemical vapor deposition is carried out with a precursor selected from the group consisting of:

silane;
disilane;
chlorosilanes;
tungsten hexafluoride;
trichlorotitanium;
tetrakisdimethylamidotitanium;
tetrakisdiethylamidotitanium;
ammonia;
tetraethylorthosilicate;
arsine;
phosphine;
borane;
diborane;
boron trifluoride;
boron trichloride;
trimethylborate;
trimethylborite;
triethylborate;
triethylborite;
phosphorous trichloride;
trimethylphosphate;
trimethylphosphite;
triethylphosphate; and
triethylphosphite.

35. A process according to claim 17, wherein the physical sorbent medium comprises a sorbent material selected from the group consisting of carbonaceous materials, silica, alumina, aluminosilicates, kieselguhr and polymeric sorbent materials.

36. A process for fabricating an electronic product including an electronic device structure, wherein the electronic device structure is fabricated with deposition of material on or in a substrate from a source fluid therefor, including the steps of:

providing a fluid source for said fluid to be used in fabricating said electronic device structure, said fluid source comprising said fluid in a fluid storage and dispensing vessel in which the fluid is sorptively retained by a physical sorbent medium;

desorbing said fluid from the physical sorbent medium as needed during the fabrication process and dispensing same from the vessel containing the physical sorbent medium; and contacting the dispensed fluid with the substrate to deposit said material on or in the substrate in said fabrication of the electronic device structure.

37. A process according to claim 35, wherein the product is selected from the group consisting of computers, personal digital assistants, telephones, flat panel displays, monitors, sound systems, electronic games, virtual reality devices, and smart consumer appliances.

38. A process according to claim 35, wherein the smart consumer applicances are selected from the group consisting of cooking appliances, refrigerators, freezers, dishwashers, clothes washing machines, clothes dryers, humidifiers, dehumidifiers, air conditioners, global positioning devices, lighting systems, and remote controllers for the foregoing.

39. A process according to claim 35, wherein the electronic product comprises a telecommunications device.

* * * * *